United States Patent [19]

Toulios

[11] 4,366,486
[45] Dec. 28, 1982

[54] LOW PROFILE ANTENNA FOR DATA TRANSPONDERS

[75] Inventor: Peter P. Toulios, Oakbrook, Ill.

[73] Assignee: Northern Illinois Gas Company, Aurora, Ill.

[21] Appl. No.: 244,017

[22] Filed: Mar. 16, 1981

[51] Int. Cl.³ .............................................. H01Q 1/36
[52] U.S. Cl. .................................... 343/899; 343/846
[58] Field of Search ............... 343/899, 873, 752, 749, 343/846

[56] References Cited

U.S. PATENT DOCUMENTS

| | | | |
|---|---|---|---|
| 3,315,264 | 4/1967 | Brueckmann | 343/752 |
| 3,435,457 | 3/1969 | Brueckmann | 343/899 |
| 3,705,385 | 12/1972 | Batz . | |

OTHER PUBLICATIONS

H. Tasik, "Antenna Engineering Handbook" chapter 3, McGraw Hill Book Co., Inc. New York, First Edition.

Primary Examiner—David K. Moore
Attorney, Agent, or Firm—Emrich, Lee, Brown & Hill

[57] ABSTRACT

A top-loaded low profile antenna for data transponders includes an antenna pin mounted vertically, affording vertical polarization for the antenna, an aluminum plate mounted in a horizontal plane and connected to an upper end of the pin, providing top-loading of the antenna, the plate being supported by a lucite frame mounted on an upper surface of the data transponder and which also dielectrically loads the antenna feed region. The load plate and lucite frame enclose the antenna pin so that the antenna is less susceptible to vandalism, and the top-loading results in a reduction in the height of the antenna structure improving the aesthetics of the antenna and data transponder installation.

11 Claims, 8 Drawing Figures

LOW PROFILE ANTENNA FOR DATA TRANSPONDERS

BACKGROUND OF THE INVENTION

This invention relates to data transmission systems, and more particularly to a low profile antenna for a data transponder in such systems.

The concept of remote interrogation of data sources has been applied to many types of systems for automating the readout of the data provided by such data sources. One such application involves the automatic readout of information provided by utility meters to expedite customer billing. One such system is disclosed in U.S. Pat. No. 3,705,385 which was issued Dec. 5, 1972 to the assignee of the present application. In the patented system, a two-way radio link is established between a mobile unit, which serves as an interrogate source, and each of several data transponders which are associated with utility meters which are to be read. Each data transponder unit receives coded signals transmitted from the mobile unit and responsively transmits coded reply data signals with represent the meter reading to the mobile unit. The reply data signals are received and decoded at the mobile unit and the reading data obtained is recorded.

In existing systems of this type, the data transponder includes a quarter wave length whip antenna for receiving signals transmitted from the mobile unit and for radiating signals generated by the data transponder back to the mobile vehicle.

The standard quarter wave whip antenna has been used in most automatic readout systems which employ "radio" interrogation, even though its use is objectionable because of its size and its aesthetic appearance. Moreover, its configuration makes it highly susceptible to vandalism. Also, in many cases, optimum transmitting and receiving efficiencies are not achieved because in view of space limitations, and for appearance sake, it may not be possible to use an antenna having the length necessary to achieve a proper impedance match with the data transponder with which it is used.

SUMMARY OF THE INVENTION

The present invention provides a data transmitting unit including a low profile antenna for an automatic data readout system. The antenna is top-loaded and has performance characteristics similar to those of a standard quarter wavelength whip antenna used in existing automatic readout systems so that the low profile antenna can be installed in existing systems as a replacement for the whip antenna. The low profile antenna is more mechanically rugged and affords more compact packaging than the whip antennas presently in use.

The low profile antenna includes an antenna pin, serving as the current carrying element of the antenna, a rectangular aluminum plate, providing top-loading for the antenna, and support means of a dielectric material which supports the load plate in a horizontal plane and facilitates mounting of the antenna on the top of the data transponder. The dielectric not only supports the plate but also dielectrically loads the antenna feed region.

Both the antenna and the transponder enclosure contribute to radiation and in effect act as an asymmetrical dipole. The dimensions of the plate and the dielectric support, and the length of the antenna pin are such that the performance characteristics of the low profile antenna are comparable with those of a quarter wave-length whip antenna. The plate has the same dimensions as those of the top surface of the transponder enclosure, to enable the antenna pin to be as short as possible for a given operating frequency, thereby minimizing the height of the antenna. The length h of the antenna pin is such that for a resonant condition at a preselected frequency $h + L_e = \lambda/4$, where $L_e$ is the effective length of the load plate.

The load plate and the dielectric support form an enclosure for the antenna pin, providing a compact and rugged structure, less prone to vandalism than are existing whip antennas. Items, metallic or otherwise, set on the top plate would have negligible effect on the operating characteristic of the antenna. In a top-loaded antenna which was constructed, the antenna pin is 2 inches in length. The antenna structure, when mounted on the data transponder, appears as a closed rectangular box, approximately 2 inches high and of the same length and width dimensions as the transponder, a structure which is more aesthetically appealing than that of known whip antennas.

DESCRIPTION OF A PREFERRED EMBODIMENT

Figure 2:
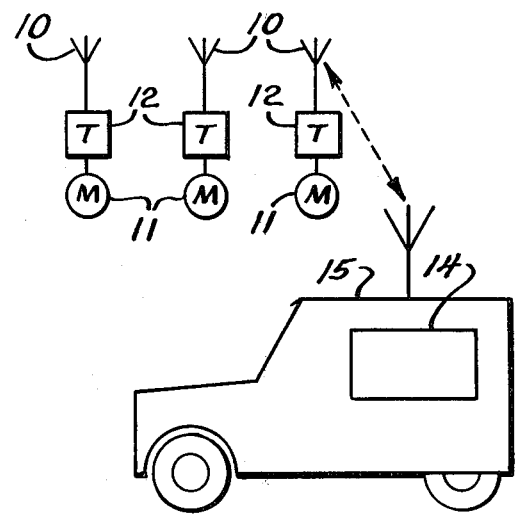
FIG. 2 is a simplified representation of an automatic data readout system including data transponders employing the low profile antenna of the present invention.
Figure 3:
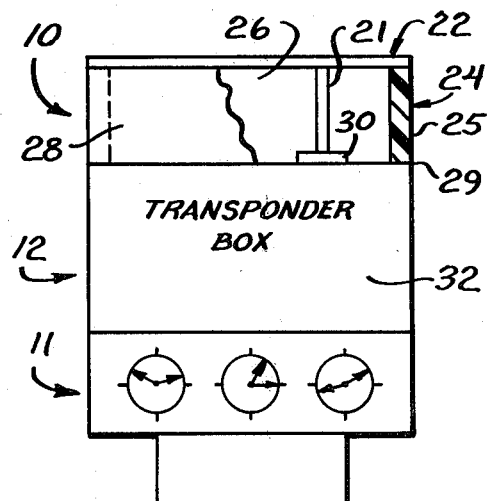
FIG. 3 is a front view of a utility meter having a data transponder mounted thereon and shows the low profile antenna, partially in section, mounted on the transponder.

The low profile antenna 10, shown in FIG. 3, is described with reference to an application in a system for providing automatic readout of readings of a plurality of utility meters. Referring to FIG. 2, each utility meter 11 has associated therewith a data transponder 12. A radio link is established between each of the data transponders 12 and an interrogate source 14 which may be fixed, or located within a mobile vehicle 15 as illustrated. An example of one such system is disclosed in U.S. Pat. No. 3,705,385 issued Dec. 5, 1972. The interrogate unit transmits interrogate signals to each of the data transponders, and each data transponder responds to the interrogate signals to generate reply data signals representing the current reading of its associated utility meter and transmits the signals back to the interrogate source. The interrogate signals are coded to represent unique "addresses" for each of the meters to permit selective readout of the information registered by the meters.

The low profile antenna 10 associated with each data transponder receives the interrogate signals transmitted from the interrogate source and radiates the reply data signals back to the interrogate source.

Referring to FIG. 3, the antenna 10 is mounted on the upper surface of the data transponder 12 which in turn is mounted on the top surface of the utility meter 11. The antenna 10 includes an antenna pin 21 which serves as the conducting element of the antenna. The antenna pin 21, which is of a metallic material, such as aluminum, is mounted vertically, affording vertical polarization for the antenna. An aluminum plate 22 mounted in a horizontal plane by way of a dielectric support, which may be in the shape of a box-like frame 24, provides top-loading of the antenna conductor 21.

Figure 4:
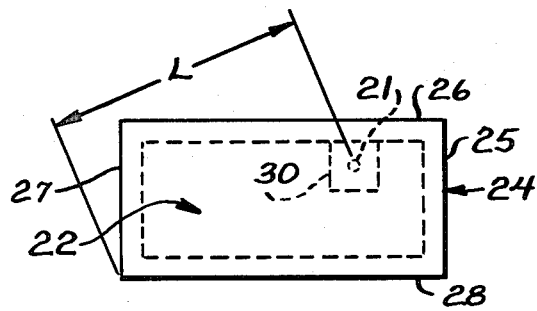
FIG. 4 is a top view of the low profile antenna.

In one antenna which was constructed for use with a data transponder having an enclosure with an upper surface 29 which was 5.46 inches long and 2.6 inches wide, the aluminum plate 22 was also 5.46 inches long and 2.6 inches wide, and the antenna pin 21 was 2 inches in length. These dimensions were derived for a data transponder having a 50 ohm output impedance and for a transmission frequency of approximately 414 MHz. The antenna plate dimensions enable the antenna to have as low a profile as possible for the operating frequency range of 410 MHz to 455 MHz. The antenna pin 21 was electrically connected to the aluminum plate 22 at a point approximately 1.94 inches from the outer surface of one side 25 of the frame and approximately 0.5 inches from the outer surface of the back wall 26 of the frame as shown best in FIG. 4. Thus, the length L from the pin to the farthest corner of the plate is approximately 4.1 inches.

The antenna frame 24 is a suitable dielectric material, such as lucite. Each of the four sidewalls 25-28 is 2 inches high and opposing walls 25, 27, and 26, 28 correspond in width and length, respectively of the top of the transponder enclosure. The thickness of the walls 25-28 of the frame was 0.25 inches. The frame not only supports the load plate 22 but also dielectrically loads the antenna feed region. The capacitance of the top-loading can be increased by increasing the wall thickness of the lucite cavity. This in turn decreases the antenna resonance frequency. The 0.25 inch thickness was selected for the monopole height of 2 inches.

An antenna feed 30 mounted on the transponder upper surface 29 facilitates connection of the antenna pin to the signal output of the transponder. The frame is secured to the upper surface of the transponder in a suitable manner. For example, the lucite frame can be glued to the transponder top. The top plate 21 can either be bolted, using plastic or other non-metallic screws, or glued to the upper edges of the frame walls. The antenna conducting element 21 is enclosed within the cavity structure formed by the top plate 21 and the frame 24.

The low profile antenna 10 has characteristics which are similar to those of the quarter wavelength whip antenna in use in existing automatic readout systems. The antenna has a 410-455 MHz frequency bandwidth, a voltage standing wave ratio (VSWR) which is less than or equal to 2 with respect to 50 ohms, an effective length which is equivalent to that of a quarter wavelength whip antenna, and the antenna has a vertical polarization. The antenna input impedance is approximately 50 ohms at the resonance frequency of 414 MHz.

The operating characteristics of the low profile antenna, relative to those of a quarter wavelength whip antenna can best be illustrated by comparing parameters, such as antenna input impedance and effective length or capture area.

In practice, a quarter wavelength whip antenna is usually fed against a ground plane the diameter of which is at least one half-wavelength long. If this is the case, the antenna will be resonant at the design frequency, measure an input impedance of 36.5 ohms and have an effective length of about $0.159\lambda$. However, for a data transponder having top/side dimensions of 2.6 inches and 5.46 inches, the dimensions of the transponder enclosure top surface are not sufficiently large with respect to wavelength. It has been found that both the whip and transponder enclosure contribute to radiation. Thus, the transponder enclosure may be viewed as one wing of an asymmetrical dipole antenna.

Figure 1:
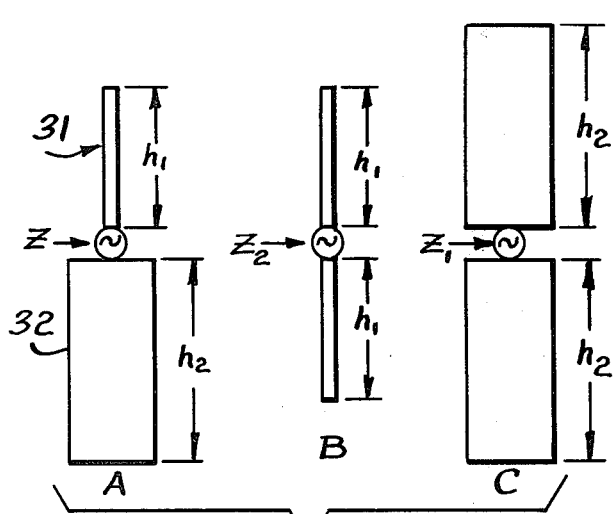
FIG. 1 which is labelled "Prior Art", is a representation of a monopole whip antenna and asymmetrical dipole antennas derivable therefrom.

FIG. 1A is a representation of a monopole antenna 31 fed against a transponder housing 32 which is modeled as a cylinder 8.5 inches long. As indicated above, the transponder enclosure may be viewed as one wing of an asymmetrical dipole antenna. The input impedance Z of an asymmetrical dipole antenna having wings characterized by a complicated geometry can be approximated using the "mean-value formula" (see H. Tasik, in "Antenna Engineering Handbook", chapter 3, McGraw-Hill Book Company, Inc., New York 1961). According to this theory, the impedance of an asymmetrical dipole can be approximated as the mean value of the impedances 1 and 2 of two symmetrical center-driven dipoles of half length equal to h1 and h2 as illustrated in FIGS. 1B and 1C, which correspond to components due to the transponder enclosure and to the whip antenna, respectively.

$$Z = \tfrac{1}{2}(Z1 + Z2) \tag{1}$$

The effective length of the asymmetrical dipole antenna can also be approximated as the mean value of the effective lengths of the two center-driven dipole antennas.

$$h_e = \tfrac{1}{2}(h_{1e} + h_{2e}) \tag{2}$$

On the basis of available theory, assuming the monopole antenna is resonant at 414 MHz, it can be shown that Z1 or 73 ohms and h1 is 9.08 inches, and that Z2 is 73 ohms and h2 is 12.34 inches. According to equations (1) and (2), the impedance of the whip antenna can be approximated as:

$$Z = \tfrac{1}{2}(73 + 73) \text{ ohms} = 73 \text{ ohms} \tag{3}$$

and its effective length as:

$$h_e + \tfrac{1}{2}(9.08 + 12.34) \text{ inches} = 10.71 \text{ inches} \tag{4}$$

For a quarter wavelength, and a resonant condition at 414 MHz, the dimensions of the top-loaded monopole must be such that $h1 + L_e \doteq 7.127$ inches, where $L_e$ is the effective length of the top plate.

To simplify the analysis, it is assumed that the length of the monopole is 2 inches and that the effective length $L_e$ of the load plate is 5.127 inches, then, at a resonant frequency the monopole radiation resistance is:

$$Z2/Z = 400(h2/\lambda)^2 = 2 \text{ ohms} \tag{5}$$

From above, the impedance component due to the transponder enclosure is Z1=73 ohms. Thus, from equation (1), the imput impedance of the top-loaded antenna can be approximated as:

$$Z = Z\frac{1}{2} = Z2/2 = 38.5 \text{ ohms} \quad (6)$$

Also, for a heavily top-loaded monopole, $$h_{2e}/2 = h_2 \quad (7)$$

so that for a monopole of 2 inches, $h_{2e} = 4$ inches. From equation (2), the effective length $h_e$ of the top-loaded antenna can be approximated as:

$$h_e + \frac{1}{4}(12.34 + 2) \text{ inches} = 8.17 \text{ inches} \quad (8)$$

Fringing effects at the edge of the load plate may reduce the frequency of resonance of the antenna. The length of the antenna rod can be reduced somewhat to allow resonance to occur at 414 MHz.

It is pointed out that the relationship $h + L_e \doteq \lambda/4$ is only an approximation which is used as a design guide. The effective length $L_e$ is the effective distance from the pin to the further corner of the top plate and it also takes into account not only fringing field effects at the edge of the top plate but also the extra capacitance of the lucite support frame. The result of these effects is to make the effective length $L_e$ of the plate always greater than the corresponding physical length L. In the present example where f is 414 MHz, $\lambda$ is 28.51" and $h + L_e = 7.127"$, when $h = 2.00"$ the effective length of the plate is approximately 5.127" whereas the actual physical length L from the pin location (FIG. 4) to the farthest corner of the plate is approximately 4.1 inches.

These theoretical calculations indicate that the effective length of the quarter wavelength whip antenna is 10.71 inches, and for the low profile antenna is 8.17 inches. Also, the expected VSWR is 1.5 for the whip antenna and 1.3 for the top-loaded antenna. Although the theoretical analysis suggests that the performance of the top-loaded antenna would be worse than that of the whip antenna by approximately 2 DB, it has been demonstrated through testing that the low profile antenna has better operating characteristics than its quarter length whip equivalent.

Figure 5:
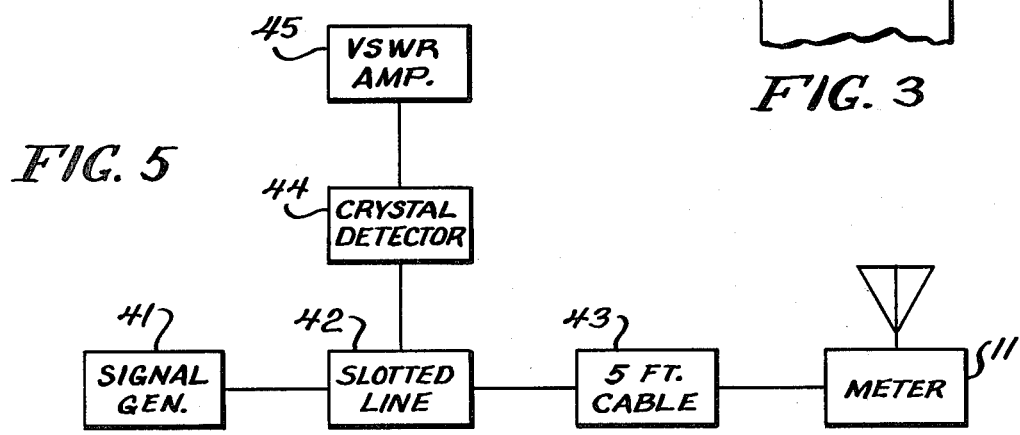
FIG. 5 is a block diagram of a test arrangement for measuring the impedance and VSWR for antennas.
Figure 6:
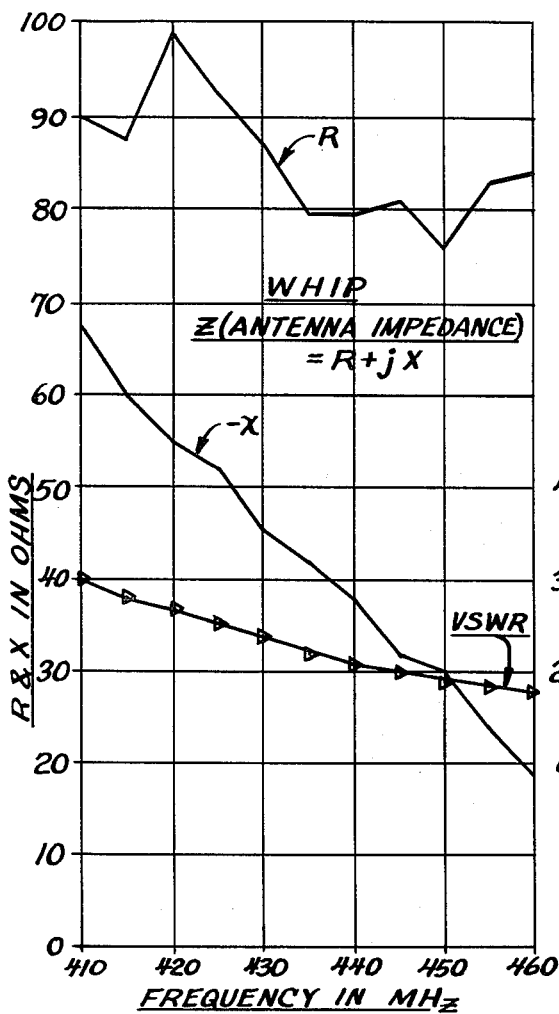
FIGS. 6 and 7, respectively, are plots of antenna impedance and VSWR versus frequency for a "prior art" whip antenna and the top-loaded antenna provided by this invention; and, FIG. 8 illustrates the transponder radiation pattern for a prior art whip antenna and the top-loaded antenna of the present invention.

Referring to FIG. 6, there is illustrated measured results of antenna impedance and VSWR vs frequency for the known 7.127 inch monopole antenna measured over a frequency range of 410 MHz to 460 MHz. A block diagram of the experimental set up is shown in FIG. 5. A signal generator 41 was connected to the antenna base by way of a slotted line 42 and a five foot cable 43. The voltage at a top of the line 42 was monitored using a crystal detector 44 and a VSWR amplifier 45 as the frequency of the excitation signal was varied from 410 MHz to 460 MHs. Since the antenna impedance is affected by the presence of metal objects, for the testing operation, the utility meter was mounted on a wooden platform seven feet above roof top level.

As shown in FIG. 6, the real component R of the antenna impedance is only slightly higher than the theoretical value of 73 ohms. However the imaginary component X is highly capacitive, which suggests that the whip must be lengthened or inductively loaded if transmitting efficiencies are to be improved. The 73 ohm value of impedance as well as the highly capacitive characteristic indicate that this antenna is not well matched to the 50 ohm transponder system, particularly at the lower end of the frequency spectrum where good matching between transmitter and antenna is essential.

As indicated above, this impedance mismatch is in part due to the small dimensions for the top of the transponder enclosure with respect to wavelength. From the standpoints of economics and aesthetics, it would be neither desirable nor practical to increase the size of the transponder enclosure, nor to add a "ground plane" of sufficient size to achieve optimum transmission efficiency. Likewise, lengthening the size of the whip would not only make the transponder installation more conspicuous and unsightly, but would also make it more attractive to vandals.

Figure 7:
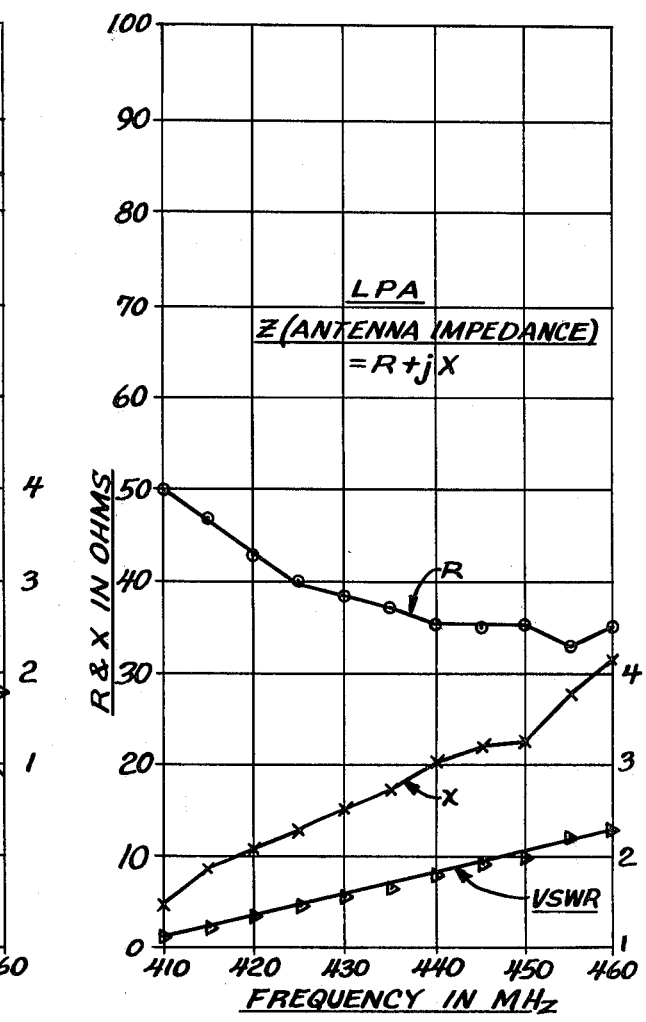

Measured impedance and VSWR for the top-loaded antenna are illustrated in FIG. 7. As shown, there is a high degree of matching over the entire spectrum of interest, particularly at 414 MHz. The measured value of antenna resistance R is approximately the same as the theoretically predicted value of 38.5 ohms. Also, the reactive component X is nearly zero at the low end of the spectrum of interest.

For the top-loaded antenna, the VSWR measured was 1.1 to 2.25 over the range of 410 MHz to 460 MHz, whereas for the whip antenna, the VSWR measured was 1.8 to 3 over this range.

Antenna performance depends not only on impedance matching but also on its effective length or capture area of a given polarization which is vertical in this case. To illustrate antenna reception efficiency, power flow into a 50-ohm load at the base of the antenna was measured using a power calibrated detector near the base of the antenna, while it was illuminated by a fixed transmitting antenna located 83 feet away from the transponder. Similarly, the transmission efficiency was illustrated by enabling the data transmitter and monitoring the power level of the transmitted spectrum 83 feet away from the location of the transponder installation. In both cases, the transponder was placed seven feet above rooftop on a wooden platform and rotated manually 360° in steps of 45°.

Figure 8:
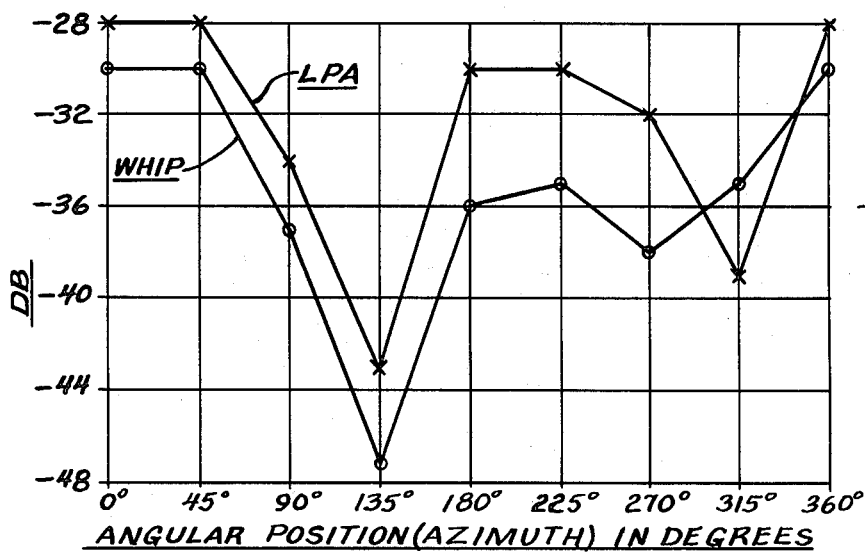

Measured results for the transponder radiation patterns are shown in FIG. 8 for a whip antenna and a top-loaded antenna under identical conditions. The performance of the top-loaded antenna is better than that of the existing whip antenna, and for the most by at least 2 DB. Similar results were also observed as to the reception efficiency for the two antennas.

Having thus disclosed in detail a preferred embodiment of my invention, persons skilled in the art will be able to modify certain of the structure which has been disclosed and to substitute equivalent elements for those which have been illustrated; and it is, therefore, intended that all such modifications and substitutions be covered as they are embraced within the spirit and scope of the appended claims.

I claim:

1. In a data readout system for transmitting data from a data collection source at a first location to a data receiving means at a second location, a data transmitting unit at the data collection source for generating data signals representing data to be transmitted for radiation to the receiving means, said data transmitting unit comprising: signal generating means for generating said data signals; an enclosure for housing said signal generating means and having a generally planar upper surface, at least a portion of said enclosure, including said planar surface, being of an electrically conducting material; and a low profile antenna mounted on said planar surface, said antenna and said enclosure effectively acting as first and second wings of an asymmetrical dipole antenna system with both said antenna and said enclosure contributing to radiation of said data signals to said receiving means, said antenna including a current carrying conductor of a length h, loading means including a generally rectangular load plate of an electrically conducting material, and support means for supporting said load plate in a plane extending horizontally at a height above said planar surface, the length and width of said load plate corresponding to the length and width of said planar surface, said current conductor being supported in a vertical orientation between said planar surface and said load plate and having one end electrically connected to said load plate and its other end electrically connected to a signal output of said signal generating means, and the sum of the effective length L of the load plate and the length h of the conductor corresponding generally to a quarter wavelength of a signal at a resonance frequency for the antenna.

2. A system according to claim 1 wherein said support means is of a dielectric material which electrically isolates said load plate from said planar surface and dielectrically loads the antenna feed region of said antenna.

3. A system according to claim 2 wherein said support means comprises a foursided frame, generally rectangular in shape and wherein the length and width of said frame correspond to the length and width, respectively of said planar surface, said load plate being secured to an upper surface of said frame, and wherein the height of said frame corresponds to the length of said current conductor.

4. A system according to claim 3 wherein said plate and said frame form an enclosure with said current conductor being contained therewithin.

5. A system according to claim 3 wherein the length of said current conductor is approximately 2 inches and the thickness of the sides of said frame is approximately 0.25 inches.

6. In a system for providing automatic readout of data representing the reading of a utility meter, said system including a data transponder unit associated with the utility meter and an interrogate means located remote from the meter and operable to generate interrogate data signals at a preselected frequency for transmission to the data transponder unit to cause it to generate reply data signals at a preselected frequency coded to represent the meter reading and for radiating the reply data signals to the interrogate source, said data transponder unit comprising: transceiver circuit means for receiving said interrogate signals and for generating said data signals; an enclosure for housing said transceiver circuit means, and having a planar upper surface, at least a portion of said enclosure, including said planar surface, being of an electrically conducting material; and a low profile antenna mounted on said planar surface, said antenna and said enclosure effectively acting as first and second wings of an asymmetrical dipole antenna system with both said antenna and said enclosure contributing to radiation of said data signals to said interrogate means, said antenna including a current carrying conductor of a length h, loading means including a generally rectangular load plate of an electrically conducting material, and support means mounted on said planar surface of said enclosure, for supporting said load plate in a plane extending horizontally at a height above said planar surface, the length and width of said load plate corresponding to the length and width of said planar surface, said current conductor being supported in a vertical orientation between said planar surface and said load plate and having one end electrically connected to said load plate and its other end electrically connected to a signal output of said transceiver circuit means, and the sum of the effective length L of the load plate and the length h of the conductor corresponding generally to a quarter wavelength of a signal at a resonance frequency for the antenna.

7. A system according to claim 6 wherein said support means is of a dielectric material which electrically isolates said load plate from said planar surface and dielectrically loads the antenna feed region of said antenna.

8. A system according to claim 7 wherein said support means comprises a four-sided frame, generally rectangular in shape and wherein the length and width of said frame correspond to the length and width, respectively of said planar surface, and load plate being secured to an upper surface of said frame, and wherein the height of said frame corresponds to the length of said current conductor.

9. A system according to claim 8 wherein said load plate and said frame form an enclosure with said current conductor being contained therewithin.

10. A system according to claim 8 wherein the length of said current conductor is approximately 2 inches and the thickness of the sides of said frame is approximately 0.25 inches.

11. In a signal transmission system including transmitting means at a first location for transmitting information signals to a receiving means at a second location, said signal transmitting means comprising: signal generating means for generating said information signals; an enclosure for housing said signal generating means and having a generally planar upper surface, at least a portion of said enclosure, including said planar surface, being of an electrically conducting material; and a low profile antenna mounted on said planar surface, said antenna and said enclosure effectively acting as first and second wings of an asymmetrical dipole antenna system with both said antenna and said enclosure contributing to radiation of said information signals to said receiving means, said antenna including a current carrying conductor of a length h, loading means including a generally rectangular load plate of an electrically conducting material, and support means for supporting said load plate in a plane extending horizontally at a height above said planar surface, the length and width of said load plate corresponding to the length and width of said planar surface, said current conductor being supported in a vertical orientation between said planar surface and said load plate and having one end electrically connected to said load plate and its other end electrically connected to a signal output of said signal generating means, and the sum of the effective length L of the load plate and the length h of the conductor corresponding generally to a quarter wavelength of a signal at a resonance frequency for the antenna.

* * * * *